Feb. 6, 1945.  F. S. SCHRAGE  2,368,784
CAR TRUCK
Filed Jan. 19, 1943  2 Sheets-Sheet 1

INVENTOR
Frederick S. Schrage
BY
Evans + McCoy
ATTORNEYS

Feb. 6, 1945.  F. S. SCHRAGE  2,368,784
CAR TRUCK
Filed Jan. 19, 1943  2 Sheets-Sheet 2

INVENTOR
Frederick S. Schrage
BY
Evans + McCoy
ATTORNEYS

Patented Feb. 6, 1945

2,368,784

UNITED STATES PATENT OFFICE 2,368,784

CAR TRUCK

Frederick S. Schrage, Rock Island, Ill., assignor, by mesne assignments, to The Bettendorf Company, Bettendorf, Iowa, a corporation of Maryland Application January 19, 1943, Serial No. 472,865

12 Claims. (Cl. 105—190)

The present invention has for an object to provide a truck of simple and relatively inexpensive construction which is designed to efficiently distribute the stresses to which it is subjected in service and which has a high load-sustaining capacity per unit of weight.

A further object is to provide a simple and economical frame structure for a truck of the fixed axle type.

A further object is to provide a truck in which the alignment and spacing of the wheels is accurately maintained, and which is of sufficiently flexible construction to permit the individual wheels to follow the contour of the track without setting up excessive stresses in the truck framework.

A further object is to provide a yieldable and rockable car body support which is maintained substantially level regardless of uneven movements of the truck wheels.

With the above and other objects in view, the invention may be said to comprise a car truck as illustrated in the accompanying drawings, hereinafter described and particularly set forth in the appended claims, together with such variations and modifications thereof as will be apparent to those skilled in the art to which the invention pertains.

Reference should be had to the accompanying drawings forming a part of this specification, in which.

Figure 1:
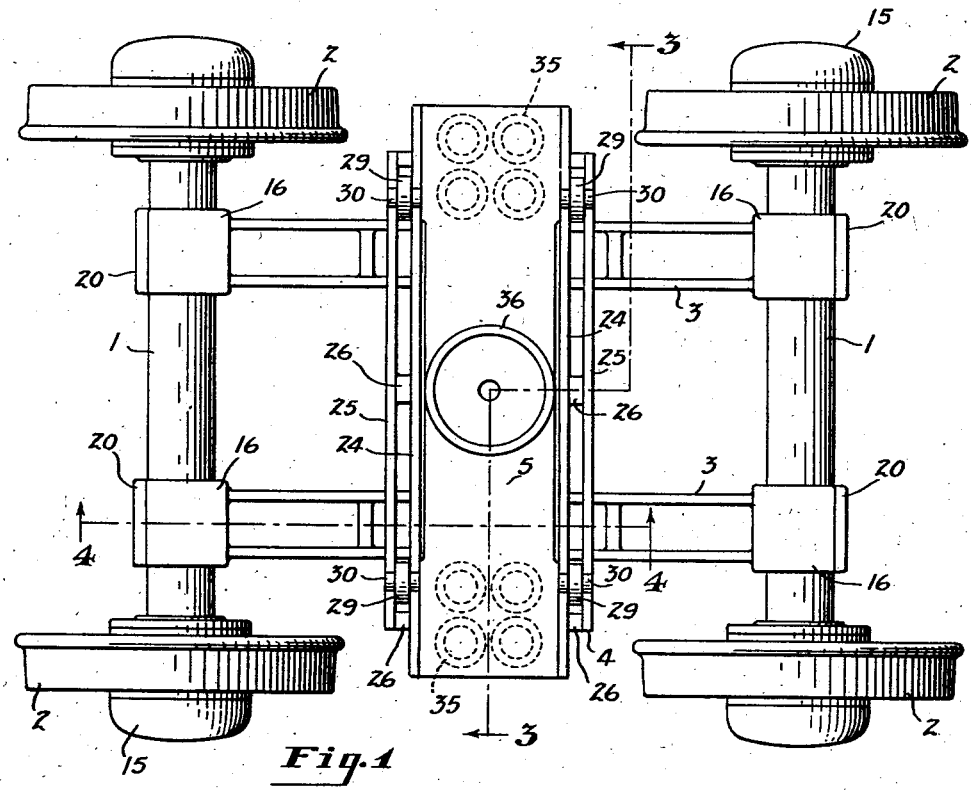
Figure 1 is a top plan view of a car truck embodying the invention.

Referring to the accompanying drawings, the truck of the present invention comprises spaced axles 1 having wheels 2 rotatably mounted upon the ends thereof, side frame members 3 connecting the axles inwardly of the wheels 2, a transom 4 extending across the space between the side frame members 3 and supported by the side frame members, and a bolster 5 which is yieldably supported within the transom.

Figure 5:
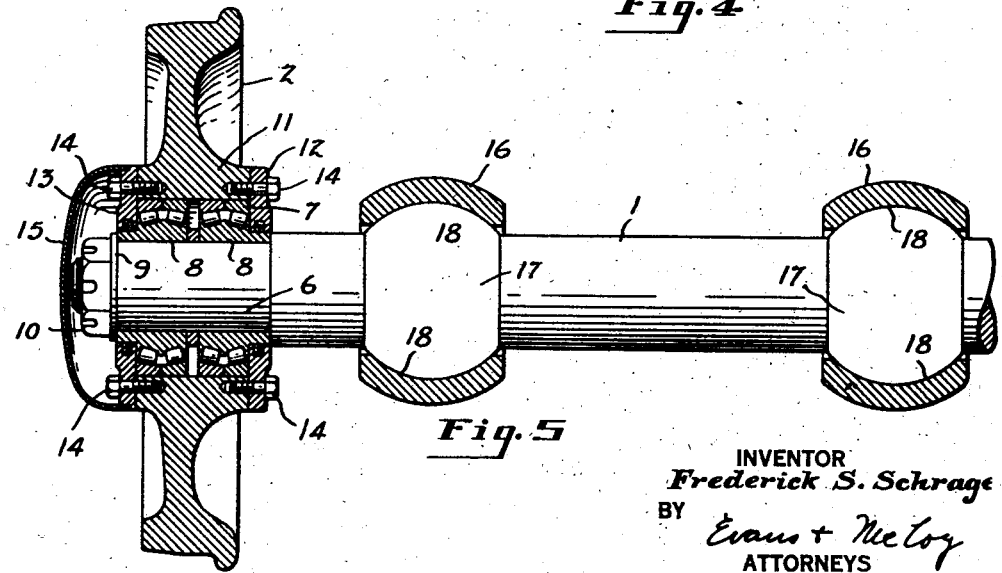
Fig. 5 is a vertical section taken on the line indicated at 5—5 in Fig. 2.

As best shown in Fig. 5, the axles 1 have reduced end portions 6 upon which are mounted roller-bearings 7, upon which the wheels 2 rotate. The bearings 7 have inner-race rings 8 which fit on the reduced end portion 6 and which are retained on the reduced end portions by washers 9 held in place by nuts 10 which are screwed on the ends of the axle. Each wheel 2 has a hub portion 11 to which are detachably secured inner and outer oil sealing rings 12 and 13 which engage with the race rings 8 at the inner and outer sides of the roller-bearings. The rings 12 and 13 are detachably secured to the wheel hub by suitable means, such as bolts 14, and carry suitable packing to prevent leakage of oil from the bearings. Each of the wheels 2 may be provided with a hub cap 15 suitably attached to the outer sealing ring 13.

Figure 2:
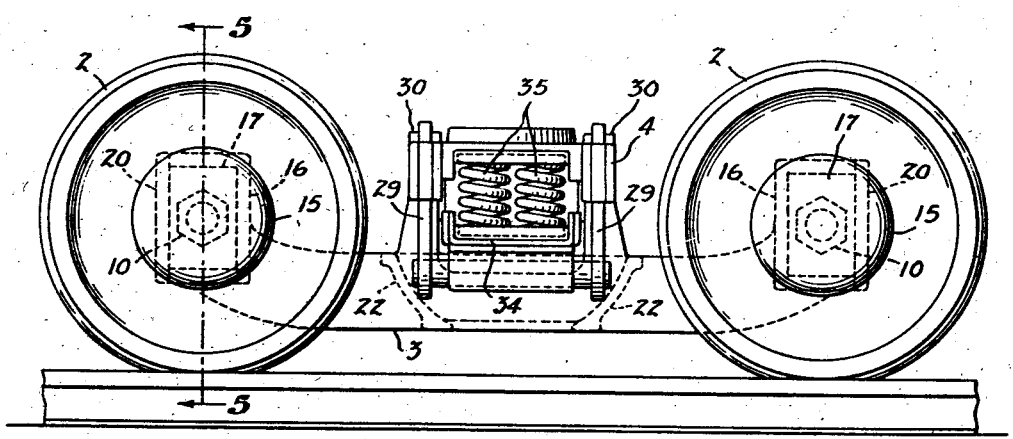
Fig. 2 is a side elevation of the car truck.
Figure 3:
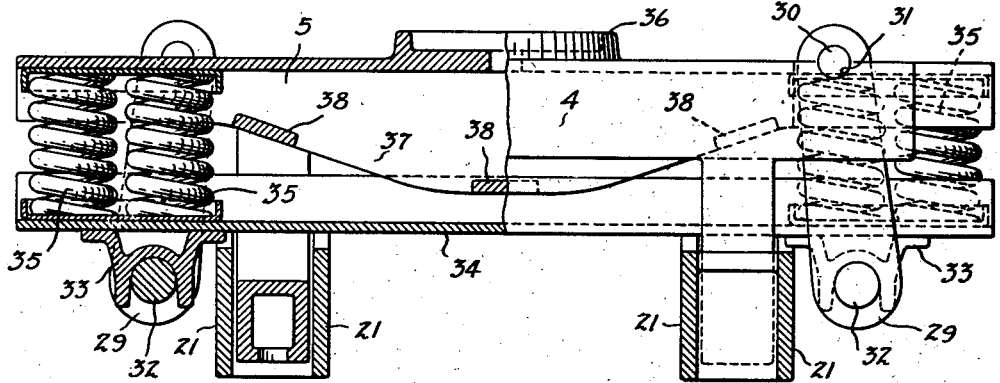
Fig. 3 is a transverse section taken on the line indicated at 3—3 in Fig. 1.
Figure 4:
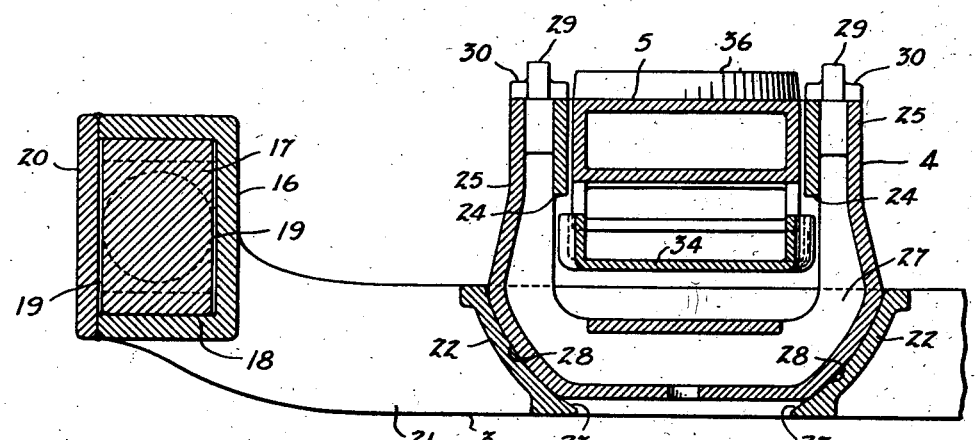
Fig. 4 is a longitudinal section taken on the line indicated at 4—4 in Fig. 1.

As shown in Figs. 2 and 4, the side frame members 3 are provided at their opposite ends with collars 16 which are formed to embrace enlargements 17 on the axles 1. The enlargements 17 have arcuate top and bottom faces 18 which are cylindrical surfaces, the axes of which are horizontal and at right angles to the axis of the axle 1. Enlargements 17 have flat front and rear faces 19 and are rectangular in cross section in planes at right angles to the axle.

In order to assemble the side frame members on the enlargements of the axle, the collars 16 fitting over the enlargements of the axle may be formed with their outer sides open and a closure plate 20 may be welded in place after the collars 16 have been assembled on the axles. The cylindrical top and bottom portions 18 serve to prevent any movement of the side frame endwise of the axle and the rectangular cross sectional form of the enlargement and collar prevents any appreciable rotative movement of the axles in the side frames. The cylindrical bearing portions of the collar 16 and enlargement 17, however, permit a slight rocking movement of the frame members with respect to the axle about a longitudinal axis, this movement being sufficient to permit the slight amount of relatively vertical movement of the wheels to enable them to follow the contour of a railway track.

Each of the side frame members 3 has spaced vertical webs 21 integrally joined at their ends to the collars 16 and braced intermediate their ends by spaced cross members 22, which also serve as supports for the transom 4. The cross members 22 are disposed upon opposite sides of the longitudinal center of each side frame member and have downwardly converging arcuate bearing faces 23 which are coaxial and provide supports for the transom 4. The transom 4 has spaced crossbars, each composed of inner and outer flat bars 24 and 25 which are connected through spacers 26 interposed between the bars.

U-shaped rockers 27 have their arms formed integral with or attached to the outer bars 25 and are provided with arcuate faces 28 at the corners of the base thereof which are formed to fit the arcuate bearing faces 23 of the side frame cross members. The rockers 27 have sliding engagement with the bearing faces 23 of the side frames so that the transom is adapted to rock about a horizontal transverse axis which is coincident with the axis of the bearing faces 23 and 28.

A pair of links 29 is suspended from the bars 24 and 25 at each end of the transom, the links 29 being disposed between the bars 24 and 25 having pivots 30 at their upper ends which engage semi-circular recesses or seats 31 formed in the top edges of the bars 24 or 25. A pair of suspension links at each end of the transom is connected by a cross-pin 32 connecting the lower ends of the links and these pins are engaged by saddles 33 attached to the underside of a spring plank 34. The saddles 33 permit the links to have pivotal movement with respect to the spring plank and since the links themselves are pivotally suspended from the transom, the spring plank is adapted to swing longitudinally of the transom. The spring plank 34 carries sets of coil springs 35 at its opposite ends, which support the opposite ends of the bolster 5. The bolster 5 is channel-form in cross section and is arranged with its channel facing downwardly. Centrally of the bolster on the top thereof there is provided a bearing 36 on which the car body is supported. The bolster has depending side flanges 37 which increase the depth toward the center of the bolster and is stiffened by cross bars 38 which are welded at spaced points to the lower edges of the flanges 37.

In operation, the individual trucks are adapted to have a slight rocking movement with respect to the car body by reason of the rocker support for the transom 4, so that irregularities in the track surface may cause movements of the trucks which are not communicated to the car body. The bolster 5 is guided in its vertical movements between the inner vertical faces of the bars 24 and the flexible suspension of the bolster from the rocker transom is adapted to permit the trucks and transom to rock with respect to the car body about a transverse axis. The side frame members as well as the bolster and transom may be in the form of castings or be built up of parts secured together by welding.

The entire truck frame structure is mounted within the supporting wheels and the parts are so combined as to provide a very rugged and durable structure.

Although a single embodiment of the invention has been herein shown and described, it will be understood that numerous modifications of the construction shown may be resorted to without departing from the spirit of this invention as defined in the appended claims.

What I claim is:

1. A car truck comprising parallel axles, wheels rotatably mounted on the ends of the axles, side frame members attached to the axles inwardly of the wheels, said side frame members having upwardly facing concave seats in the top faces thereof substantially midway between their ends, a transom having rockers formed to fit said seats, and a bolster yieldably supported by said transom.

2. A car truck comprising parallel axles, wheels rotatably mounted on the ends of the axles, side frame members attached to the axles inwardly of the wheels, a transom having spaced parallel bars and depending rockers near opposite ends which engage said side frame members, suspension links pivoted at their upper ends to said bars, a spring plank carried by said links, overlying said side frame members and projecting past the same, springs mounted on said spring plank, and a bolster seated on said springs and guided for vertical movement between said bars.

3. A car truck comprising parallel axles, wheels rotatably mounted on the ends of the axles, side frame members attached to the axles inwardly of the wheels, said side frame members each having an elongated recess in the top face thereof intermediate its ends, a transom comprising a pair of parallel crossbars and a pair of U-shaped connecting members having spaced arms connected at their upper ends to said crossbars, each connecting member having a base portion fitting in one of said recesses, and a bolster yieldably supported by the transom for vertical movement between said crossbars and between the arms of said connecting members.

4. A car truck comprising wheels, front and rear axles, side frame members supported at their ends upon said axles, each side frame having laterally spaced vertical side walls and spaced cross members between said walls, a cradle transom having rockers projecting downwardly therefrom adjacent opposite ends thereof and received between the side walls of the side frame members and slidably supported on said cross members, and a bolster yieldably supported by said transom.

5. A car truck comprising wheels, front and rear axles, side frame members supported at their ends upon said axles, a cradle transom extending across the space between said side frames, said transom having spaced longitudinal bars and U-shaped cradles connecting said bars and rockably mounted on said side frames, links pivotally suspended from said bars, a spring plank carried by said links and projecting past said side frame members, springs on the spring plank outwardly of the side frame members, and a bolster supported on the springs and guided for vertical movement between said spaced bars.

6. A car truck comprising wheels, front and rear axles, side frame members supported at their ends upon said axles, each side frame having spaced vertical side walls and spaced cross members between said walls, said cross members having arcuate downwardly converging seating faces which have a common axis, a cradle transom having rockers projecting downwardly therefrom adjacent opposite ends thereof and received between the side walls of the side frame members, each rocker having a bottom arcuate face which slidably fits upon the spaced seating faces of the cross members, and a bolster yieldably supported by said transom.

7. A car truck comprising parallel axles, supporting wheels rotatably mounted upon the ends of the axles, side frame members attached to said axles inwardly of the wheels and having upwardly facing recesses provided with arcuate seats substantially midway between their ends, a cradle transom extending across the space between the side frame members and having depending rigidly attached rockers disposed in said recesses which have convex faces slidably fitting said arcuate seats, a spring plank flexibly suspended from said transom above the rockers, said spring plank being of greater length than the transom and extending into the spaces between the wheels at each side of the truck, a bolster substantially coextensive with the spring plank, and springs interposed between the ends of the spring plank and bolster.

8. A car truck comprising parallel axles, supporting wheels rotatably mounted upon the ends of the axles, side frame members attached to said axles inwardly of the wheels and having upwardly facing recesses in the top faces thereof provided with arcuate seats substantially midway between their ends, a cradle transom extending across the space between the side frame members above the same and having depending rigidly attached rockers disposed in said recesses which have convex faces slidably fitting said arcuate seats, said transom comprising spaced longitudinal bars with vertical opposed faces, and a bolster yieldably supported in the transom and guided for movement between the opposed vertical faces of said bars.

9. A car truck comprising parallel axles, supporting wheels rotatably mounted upon the ends of the axles, side frame members attached to said axles inwardly of the wheels and having depressed central portions provided with upwardly facing recesses provided with arcuate seats substantially midway between their ends, a cradle transom extending across the space between said side frames above said side frame members, said transom comprising spaced parallel crossbars and U-shaped rockers having bases and spaced arms, the upper ends of which are attached to said bars, said bars having opposed parallel guide faces, said rocker bases projecting beyond the crossbars and slidably fitting said concave seats, and a bolster yieldably supported in the transom and guided for movement between the opposed vertical faces of said crossbars.

10. A car truck comprising parallel axles, bearings carried by the ends of said axles, wheels rotatably mounted on said bearings, each axle having an enlargement inwardly of each of its wheels, said enlargements being rectangular in cross sections at right angles to the axle and having arcuate top and bottom faces which lie in the surface of a cylinder having its axis at right angles to the axle and side frames having end portions which embrace said enlargements and which have internal surfaces conforming to said enlargements.

11. A car truck comprising parallel axles, wheels rotatably mounted upon the ends of the axles, side frame members, each having upwardly projecting end portions attached to the axles inwardly of the wheels at one side of the truck, a transom overlying said side frame members midway between the axles, a spring plank flexibly suspended from said transom and overlying said side frame members with its ends projecting past said members, a bolster above the spring plank and substantially coextensive therewith, and springs interposed between the spring plank and bolster outwardly of said side frame members.

12. A car truck comprising parallel axles, wheels rotatably mounted upon the ends of the axles, side frame members, each having upwardly projecting end portions attached to the axles inwardly of the wheels at one side of the truck, each side frame member having an elongated recess in the top face thereof intermediate its ends, a transom comprising a pair of parallel cross bars and a pair of U-shaped connecting members having spaced arms connected at their upper ends to said cross bars, each connecting member having a base portion rockably mounted in one of said recesses, a spring plank flexibly suspended from said cross bars and positioned between said arms, said spring plank extending past said side frame members into the spaces between the truck wheels, a bolster substantially coextensive with said spring plank mounted for vertical movement between said cross bars, and springs interposed between said spring plank and bolster.

FREDERICK S. SCHRAGE.